United States Patent

[11] 3,559,861

[72] Inventor Austin A. Knox
Stamford, Conn. (Topstone Road, Ridgefield, Conn. 06877)
[21] Appl. No. 646,276
[22] Filed June 15, 1967
[45] Patented Feb. 2, 1971

[54] PRESSURE MEMBER AND GUIDE FOR MAGNETIC TAPE
10 Claims, 7 Drawing Figs.

[52] U.S. Cl. .......... 226/168, 226/187, 226/190
[51] Int. Cl. .......... G11b 15/28
[50] Field of Search .......... 226/187, 177, 180, 181, 190, 194, 196, 199, 168

[56] References Cited

UNITED STATES PATENTS

| | | | |
|---|---|---|---|
| 3,099,376 | 7/1963 | Kennedy | 226/108 |
| 3,132,788 | 5/1964 | Johnson | 226/184 |
| 3,289,906 | 12/1966 | Schuller | 226/168 |
| 3,424,360 | 1/1969 | Trott | 226/168 |

*Primary Examiner*—Allen N. Knowles
*Attorney*—Blair, Buckles, Cesari & St. Onge

ABSTRACT: This disclosure comprises a pressure member for urging magnetic recording tape against the capstan in the tape transport. The pressure member is of a height less than the width of the tape and accordingly, the pressure member engages only the back side of the tape. One embodiment of the pressure member does not rotate and to accommodate tape splices has a plurality of base screws over its face for the threading of tape splices. The pressure member can be positioned by a bifurcated support in a magnetic tape cartridge for precise orientation of the pressure member. For aligning the tape there is disclosed a spoollike guide member at the forward edge of the tape cartridge, the spool being vertically movable as it engages a rigid guide member on the machine to position the spool and the tape with respect to the transducer head.

PATENTED FEB 2 1971

3,559,861

INVENTOR
Austin A. Knox
BY
Blair Buckles Cesari + St. Onge
ATTORNEYS

PRESSURE MEMBER AND GUIDE FOR MAGNETIC TAPE

BACKGROUND OF THE INVENTION

In the tape transport systems of magnetic tape recorders and reproducers the problem of flutter, i.e., frequency variations in excess of 6 cycles per second, contributes substantially to a loss of fidelity. The problem of reducing the flutter component is present in reel-to-reel tape transports and in tape transports employing an endless loop tape cartridge wherein the tape is pulled from the inner turn of the tape mass and then after being pulled over the transducer head is rewound on the outside of the same tape mass. In both of these types of tape transport systems, the prior art pinch roller which urges the tape against a rotating capstan has contributed substantially to the flutter component.

Prior art pinch rollers generally have a wide rubber periphery with a bearing member at its center. Thus, as the tape is driven by the capstan and pulled past the transducer head, the rubber pinch roller urges the tape against the capstan and is itself rotated by the capstan as the tape is moved therebetween. The use of such a prior art pinch roller with a cover of rubber or similar flexible material, introduces flutter into the system as follows. The prior art pinch rollers have been wider than the tape and accordingly, the rubber pinch roller is urged into contact not only with the tape, but also with the rotating capstan. Magnetic tape varies in thickness from one-fourth mil to 2 mils and the tape is made of a harder material than the pinch roller. Accordingly, when the pinch roller is urged into contact with the tape, the softer pinch roller surface is indented by an amount approximately the thickness of the tape. Thus, as the capstan is driving both the tape and the pinch roller, the pinch roller is subjected to being driven at two slightly different speeds. One speed is that of the capstan directly contacting the pinch roller and the other speed is that of the tape transmitting the driving force from the capstan to the pinch roller. Because of the indentation of the tape into the capstan, however, that area of the pinch roller has smaller effective radius, and the linear speed at which the tape attempts to drive the pinch roller differs from the speed at which the capstan attempts to drive the pinch roller. These two forces acting on the rubber pinch roller cause a flexure in the rubber surface resulting in a dragging or skidding of the pinch roller surface on the capstan or on the tape, depending upon the relative coefficient of friction. This flexure motion in the pinch roller is transmitted to the tape and results in the introduction of a flutter component into the system.

A further problem with prior art rubber-covered pinch rollers is that the rubber may not be completely homogeneous throughout its structure. Since the pinch roller is rotating, variations in rubber density will contribute a small amount of flutter. The problem of density variations can be obviated to some degree by making the pinch roller very large in diameter and by using a premium grade of rubber. Both of the approaches however, are quite expensive and in the case of endless loop tape cartridges, may be prohibitively expensive.

Still a further problem with prior art pinch rollers is that variations in tape feed from the source whether it is from a reel supplying tape or from an endless loop hub in which multiple turns of tape are sliding in relationship to each other, a variation in tape tension is present which contributes to the component of flutter present. As a hold back variation in tension in the tape occurs, it tends to stress the rubber of the pinch roller until the elasticity of the rubber overcomes this retarding force, causing the tape to snap forward. This stressing and abrupt snapping back of the rubber pinch roller surface introduces a flutter component in the tape and reduces fidelity when it occurs with other flutter producing conditions.

Another problem of prior art tape transports having multitrack tapes is in the maintaining of proper alignment of the tape tracks with the multiple record play laminations of the transducer head and curling of the tape edge because of the tape guiding system. These problems are particularly prevalent in tape cartridges wherein the tape guide post, over which the tape passes before contacting the transducer head, is secured to a wall or base of the tape cartridge which may be made of plastic or similar material, and in which a thin tape guide is built into the cartridge. In such cases a warping of the cartridge bottom to which the post is secured will result in misalignment of the recorded track on the tape with the transducer head or edge deformation of the tape may occur to the point of losing the information on one track.

Some prior art attempts to overcome the foregoing disadvantages have included the use of a pinch roller having a very hard rubber surface to reduce flexing action, and by using various damping devices so that the flutter component being generated in the tape mass will not be amplified by the flexing rubber pinch roller. These approaches however, are relatively expensive to accomplish an appreciable amount of flutter reduction in a system.

Accordingly, it is an object of the present invention to provide apparatus for reducing the flutter component in magnetic tape recorder/reproducers.

Another object of the invention is to provide apparatus of the above character comprising a pressure member for urging the tape against the capstan in the tape transport system.

A further object of the invention is to provide apparatus of the above character wherein the pressure member may be nonrotating.

Another object of the invention is to provide apparatus of the above character wherein variations in tape thickness and tape splices may be accommodated.

A further object of the invention is to provide apparatus of the above character wherein the tape may be accurately positioned with respect to the transducer and pressure member in operation.

Another object of the invention is to provide apparatus of the above character which is relatively inexpensive to manufacture and reliable in operation.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

DETAILED DESCRIPTION

Figure 1:
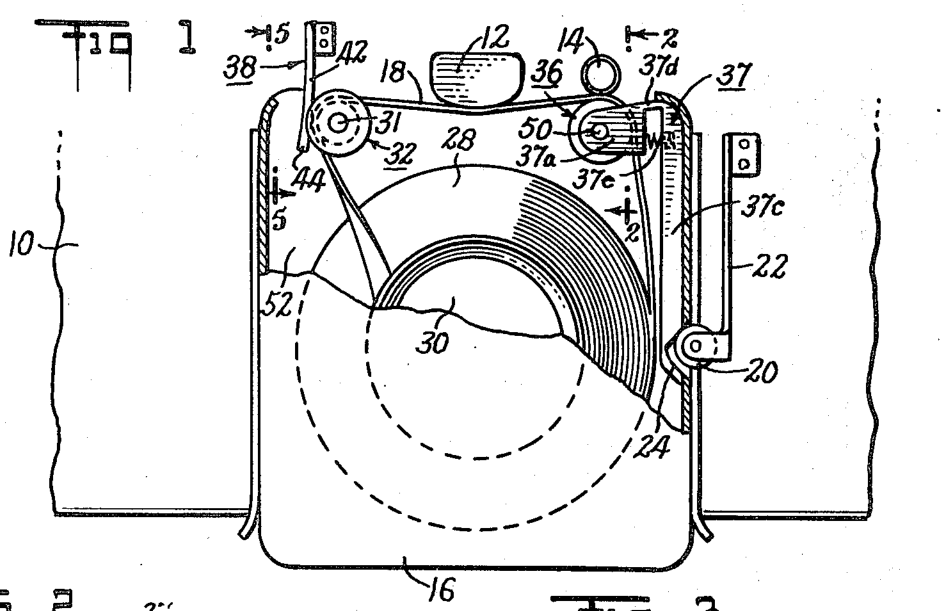
FIG. 1 is a top view partially broken away of a tape cartridge inserted into a tape transport mechanism and employing the tape pressure member and tape positioning element of the invention.

As shown in FIG. 1, a tape deck 10 having a transducer head assembly 12 and capstan 14 thereon as means for receiving a continuous tape cartridge 16 and urging the tape loop 18 into engagement with the transducer head by spring urged roller 20 engaging cartridge notch 24. As is generally known in the art, a continuous loop tape cartridge has a tape mass 28 wound around hub member 30 wherein tape is fed from around the hub, passed over guides 32, and over the transducer head 12 as it is pulled by the capstan 14 to be rewound on the exterior of the tape mass. To provide for movement of tape a pressure member 36 in the cartridge is positioned opposite the capstan 14 to press the tape against the capstan with sufficient force to effect tape transport by the capstan.

Figure 2:
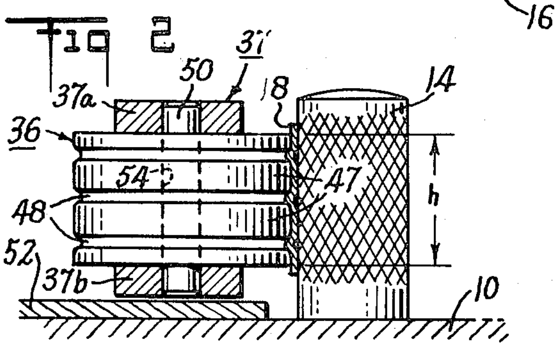
FIG. 2 is an enlarged partial side view taken along line 2–2 of FIG. 1, and showing one embodiment of a pressure member of the invention.

The invention relates to a new pressure member 36 and a coacting tape guide locator 38. As shown in FIG. 2, the pressure member 36 is made of a relatively hard low-friction material which may or may not rotate in pressing the tape against the capstan. The hard material cannot cup on contact with the rotating capstan under normal pressures used to urge the pressure member against the capstan. The usual effect of cupping of the pinch roller in a magnetic tape cartridge is the condition known as spewing.

The tape is under tension as it approaches the capstan and pinch roller. This tension is relieved as the tape leaves the capstan. If there is no cupping of the pinch roller the tape leaves in a straight line and proceeds smoothly into the cartridge housing.

If the pinch roller is cupped, the tape is leaving the capstan at an angle inclined toward the front of the cartridge and the size of the angle in relation to the above straight line condition is determined by the pressure applied and the durometer of the pinch roller. If the tape is angled toward the front the tape tends to escape from the housing and frequently becomes tangled. If this condition is attempted to be corrected by offsetting the center of the pinch roller in relation to the center line of the capstan, the tape may then spew into the center of the cartridge housing.

The problem of controlling pressure on a cupping pinch roller and the precise alignment of the two center lines of the pinch roller and capstan to guarantee the tape exit line is difficult to control with any reasonable economical design of cartridge and tape transport parameters.

Further, the pressure member 36 of my invention shown in FIG. 2, is of a height which is slightly less than the width of the tape, and accordingly, there is no contact between the pressure member and the capstan. With the use of a nonrotating pressure member which does not contact the capstan, a number of problems which generate flutter are obviated. With the pressure member being nonrotating there is no variation in density or concentricity as the tape is pushed against the capstan and since the pressure member does not contact the capstan there is no deleterious flexing of its surface.

Figure 7:
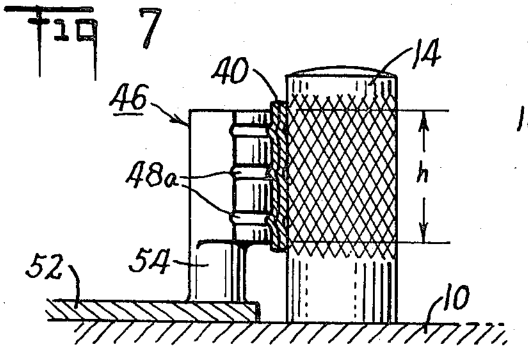
FIG. 7 is a side view of the embodiment shown in FIG. 6 taken along line 7–7 thereof.
Figure 6:
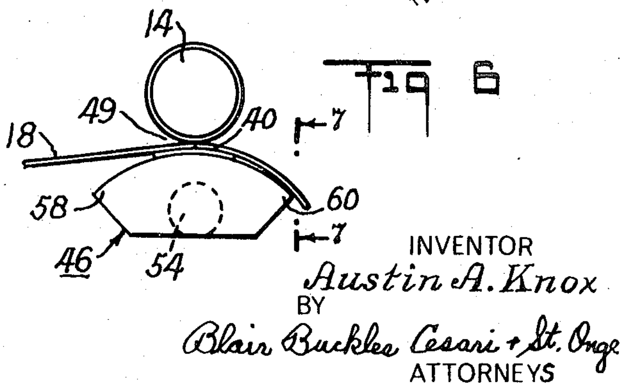
FIG. 6 is an enlarged top view of another embodiment of the pressure member of the invention showing the relationship of the tape and capstan to the pressure member.

Since the pressure member may be nonrotatable, it may be formed of a stationary curved portion 46 as shown in the embodiment disclosed in FIGS. 6 and 7.

Figure 4:
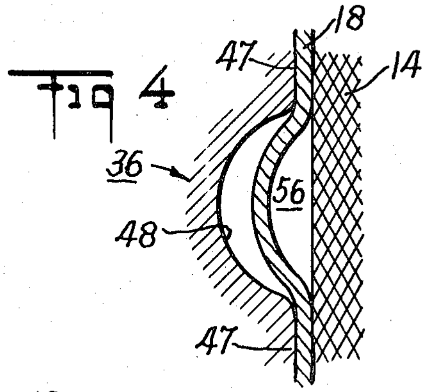
FIG. 4 is an enlarged partial sectional view showing a peripheral groove of the pressure member.

As shown in FIGS. 2, 4, and 7, I have found that a plurality of annular grooves 48 provide a self-threading action for tape splices, preventing peeling of the splice as it is passed between the nonrotating pressure member and capstan. As shown in enlarged detail in FIG. 4, the grooves 48 provide a threading action for the tape and tape splices as the tape is passed between the pressure member and capstan.

Figure 5:
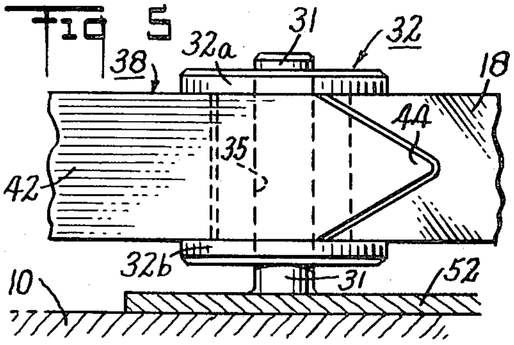
FIG. 5 is an enlarged side view of the tape guide positioning apparatus of the invention.

As shown in FIGS. 1 and 5, my tape guide locating member 38 comprises a rigid protruding bar 42 having a vertical double tapered end 44. The bar 42 is secured to the tape deck and positioned for engagement with the upper and lower flanges 32*a* and 32*b*, respectively, of the spoollike guide 32. By close engagement of the flanges 32*a*, 32*b*, the guide 32 and the tape passing thereover is accurately positioned with respect to the transducer head and the tape is more accurately aligned therewith to overcome misalignment problems caused by slight warpage of the tape cartridge. This is particularly desirable in multitrack tapes which may have as many as 8 tracks on a ¼-inch tape, the tracks being narrow and spaced very close together.

It can be seen that the tape is guided only when it is formed into an arc which is in excess of 90° and the edge in contact with tape guide is equal to or greater than $\pi R2/4$ of the corner spool. Thin, fragile tapes are thus easily and reliably guided with no edge deformation. The tape is thus formed into a portion of a cylinder for great strength and extreme resistance to edge deformation. Prior art guide members are usually less than one-sixteenth inch in thickness and guide the tape in a longitudinal position when it has very little resistance to edge deformation.

Figure 3:
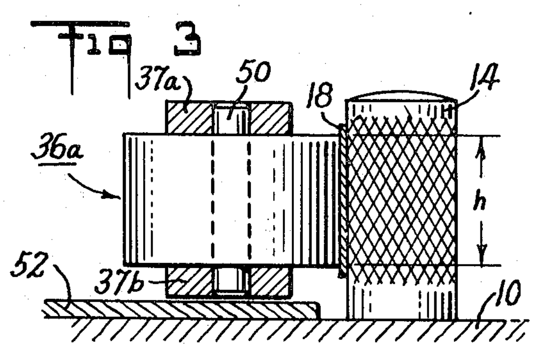
FIG. 3 is an enlarged partial side view showing another embodiment of a pressure member of the invention.

The pressure member 36*a*, shown in FIG. 3, is similar to that of FIG. 2 except that its surface is not grooved and is mounted for rotation as the tape passes thereover.

Referring now to FIGS. 1, 2, and 3, the invention will be described with more particularity. The pressure members 36 or 36*a* shown in FIGS. 1—3, are mounted on a post 50 through central bore 54. As shown in FIG. 1, the pressure member 36 is supported by a rigid member 37 having bifurcated ends 37*a* and 37*b* which support post 50. The elongated shank portion 37*c* supports the bifurcated portions 37*a* and 37*b* through a flexible narrow section 37*d* with spring 37*e* urging the pressure member 36 toward the capstan. The lower end of portion 37*c* is formed into and around the cartridge notch 24 against which roller 20 bears through leaf spring 22 which is secured to the tape deck 10 at 21. Thus roller 20 urges the cartridge into engagement with the transducer head and the tape transport capstan. The support member 37 may be made of precision molded plastic, for example, to accurately align the pressure member 36 to the capstan and the tape passing thereover with the transducer head. The remainder of the cartridge, however, can be made of much less expensive material and in some instances it may be made of paper. Prior art cartridge cases were made of very strong rigid and thick material with precision molding techniques for the whole cartridge, since the pinch roller pressure was transmitted by the cartridge case. With my pressure member support as shown in FIG. 1, the remainder of the cartridge can be much less expensively made. The support member 37 is bonded by an adhesive or secured mechanically to the cartridge housing.

The pressure members 36 and 36*a* are preferably made of a relatively hard low-friction polymeric material such as nylon or nylon impregnated with Teflon or it can be made of other low-friction materials that are self-lubricating, such as polyethylene or materials impregnated with other low-friction materials. For the nonrotating pressure member of FIG. 2, it is desirable to reduce friction between the pressure member and the tape as the tape moves between the pressure member and the capstan. For pressure members that are rotatable as shown in FIG. 3, the self-lubricating material provides a low coefficient of friction between the roller and the supporting post and does not allow the tape to stick to the rotating roller surface.

I have found that even though the pressure member 36 mounted on post 50 may be rotatable as shown in FIG. 3, that the pressure member does not have to rotate when it is made of a relatively hard, low-friction polymeric material. The member 36 will assume a static position opposite the capstan at a point of minor radius as it urges the tape against the capstan. Accordingly, in some applications it may be desirable to have a slightly exaggerated minor radius for the pressure member which would be maintained at a pressure point on the pressure member exterior. In this mode, since the pressure member does not rotate continuously, but only when a splice appears, it becomes readily apparent that the problems of flutter caused by eccentricity of the pressure roller are eliminated, as well as those problems which are encountered in rubber-covered pressure rollers such as the flexing of the pressure member surface as it engages both the tape and capstan.

The embodiment shown in FIGS. 6 and 7 is nonrotatable and comprises an arcuate portion 46 for the pressure member which is secured against rotative movement and is urged toward the capstan 14 which provides the frictional engagement of the tape 18 therewith. The pressure member 46 may be a circular segment of less than 90° and is made of a hard, low-friction polymeric material as in the FIG. 1—3 embodiments. As seen in FIG. 6, the curvature of leading portion 58 of pressure member 46 readily guides the tape 18 while the curved trailing portion 60 provides a postlike guide for the tape as it passes thereover to be rewound on the cartridge hub.

As shown in FIG. 7, the pressure member 46 may be supported by a post 54 secured to the cartridge base 52 which is positioned on the tape deck 10 when the cartridge is inserted into place. As shown in FIG. 7, the grooves 48*a* are positioned longitudinally with respect to the tape travel for accommodation of tape splices as in the FIG. 2 embodiment. The dimensions of the grooves 48*a* are preferably the same as the dimensions for the grooves 48 in the FIG. 2 embodiment.

In operation, the tape enters the leading edge of the post support. This is of a dimension to act as a tape guide for the tape leaving the record play head. The post or roller is held in place by a pin which is contained top and bottom by support members 37*a*, and 37*b* secured to the cartridge housing. For removal of the tape from the cartridge, the pin may be slipped out and post or roller is removed and tape slipped out. As can be seen, the pressure urging the post or roller against the capstan is transmitted by the rigid molding and is independent of the strength or thickness of the cartridge housing.

I have further found that with a smooth-surfaced, nonrotating pressure member that the tape splices tend to peel back and separate, eventually causing a break in the tape continuity. To obviate this problem I have found that providing several annular grooves 48 in the pressure surface contacting the tape will eliminate such splice peeling. The grooves 48 for a ¼-inch tape system as shown in FIG. 2, should be from about .010 to .015 inch wide with approximately the same depth. The lands 47 between the grooves 48 should be about three times the width of the grooves. As shown in FIG. 7, a splice 40 is readily passed between the grooved pressure member and capstan without any peeling taking place since the grooves 48 provide a self-threading action which permits the splice to be drawn into the nip area 49 between the pressure member and the capstan. As shown in FIG. 4, the groove 48 is enlarged to illustrate the tape 18 tending to bend into the relieved area 56 on the capstan side of the tape. I have found that with my grooved, nonrotating pressure members, a tape splice is readily passed between the pressure member and capstan without pushing back on the leading edge of the splice.

Referring now to FIG. 5, it will be seen that the rigid member 38 by close engagement with the flanges 32*a*, 32*b* of the spoollike guide 32, will locate the guide 32 vertically at a predetermined position with respect to the transducer 12 for more accurate alignment of the recorded tracks on the tape 18. The flange tape guide 32 is thus slidably supported on the pin 31 which is secured to the cartridge bottom 52 and which has the case top as an upper stop. The bore 35 of the tape guide 32 is slidably fitted over the pin 31 to provide ease of vertical movement of the guide 32.

The locating member 38 may be made of metal or a polymeric material which has the requisite strength and thickness to move the guide 32 by engagement with its double tapered end 44 when the cartridge is pushed into a tape recorder/reproducer as shown in FIG. 1. Guide 32 is preferably made of a low-friction polymeric material such as polyethylene or nylon so that it slides easily on the pin 31. Thus, if the cartridge casing is not precisely molded or is warped, the "floating" guide 32 will be positioned by locating member 38 to more accurately align the recorded track with the transducer head of the machine. If the cartridge bottom 52 is warped, the positioning of the guide 32 with respect to the transducer heads has been found to be very desirable, particularly with multitrack tapes.

For either of the pressure member embodiments shown, I have found the following parameters to give very satisfactory performance. For an endless loop magnetic tape cartridge having up to 4,800 feet of ¼-inch wide tape the height *h* of the pressure member as shown in FIGS. 2, 3, and 7, respectively, is preferably about .23 inch, but may range in height from about .125 to .250, as long as no portion of the pressure member overlaps either side of the tape as the tape is urged into contact with the capstan. For a tape transport for ¼-inch wide tape having a capstan of about ¼-inch in diameter, about 1 to 2 pounds of pressure urging the pressure member toward the capstan provides a positive tape drive at practical playback speeds because all the force is used to pinch the tape. The whole cartridge may be spring-urged toward the capstan and the pressure member spring-urged or either construction above may be used.

For the FIG. 1—3 embodiment, the pressure member 36 should have a diameter of from one-half to three-fourths inch for ¼-inch wide tape. The FIG. 6—7 embodiment should have a radius of curvature of one-fourth inch or less.

I have found that with either of the above embodiments that the amount of flutter is appreciably reduced with the pressure members of my invention. The tape tracks over the pressure member surface with a single unchanging line of pressure contact against the back side of the tape as it urges the tape against the capstan to eliminate the sources of flutter found in prior art tape cartridges and tape transport systems.

Although an endless loop magnetic tape cartridge is shown, it should be understood that the pressure member of my invention may be employed in reel-to-reel tape transport systems with the same advantages of performance and reduction of flutter.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

I claim:

1. In magnetic tape recording/reproducing apparatus having a transducer, magnetic tape reel means, and a capstan for moving tape past said transducer head, a pressure member for urging the tape against said capstan comprising:

A. a curved, low-friction portion for engaging the side of said tape opposite that engaged by said capstan,
   1. said curved portion having a plurality of grooves on its tape engaging surface, said grooves being parallel to the direction of tape travel thereover;

B. said pressure member having a height in the area contacting said tape of less than the width of said tape; and C. means for urging said pressure member toward said capstan to press said tape thereagainst.

2. In magnetic tape recording/reproducing apparatus having a transducer, magnetic tape reel means, and a capstan for moving tape past said transducer head, a pressure member for urging the tape against said capstan comprising:

A. a curved, low-friction portion for engaging the side of said tape opposite that engaged by said capstan;

B. said curved portion having a plurality of grooves on its tape-engaging surface, said grooves being parallel to the direction of tape travel thereover; and C. means for urging said pressure member toward said capstan to press said tape thereagainst.

3. In magnetic tape recording/reproducing apparatus having a transducer, magnetic tape reel means, and a capstan for moving tape past said transducer head, a pressure member for urging the tape against said capstan comprising:

A. a pressure member roller,
   1. mounted on a central shaft for rotation thereon;

B. said pressure member roller having a height in the area contacting said tape of less than the width of said tape,
   1. said roller having a plurality of grooves on its tape-engaging surface, said grooves being parallel to the direction of tape travel past said roller; and C. means for urging said pressure member roller toward said capstan to press said tape thereagainst.

4. The pressure member defined in claim 3 wherein said pressure member is mounted in a magnetic cartridge and said means for urging said pressure member toward said capstan comprises spring means urging said pressure member toward said capstan.

5. In magnetic tape recording/reproducing apparatus having a transducer, magnetic tape reel means, and a capstan for moving tape past said transducer head, a pressure member for urging the tape against said capstan comprising:

A. a curved, low-friction portion for engaging the side of said tape opposite that engaged by said capstan;

B. said pressure member having a height in the area contacting said tape of less than the width of said tape;

C. means for urging said pressure member toward said capstan to press said tape thereagainst;

D. a cartridge for holding said magnetic tape reel means, said pressure member and said means for urging said pressure member toward said capstan, 1. said cartridge having a tape guide member spaced from said pressure member and having upper and lower flanges for guiding tape over the transducer head when said cartridge is inserted into a recorder/reproducer; and E. a guide positioning camming element secured to said tape recorder/reproducer having upper and lower surfaces for camming and holding said flanges to position said tape guide with respect to the transducer head.

6. In magnetic tape recording/reproducing apparatus having a transducer and adapted to receive a magnetic tape cartridge, a tape-locating and positioning assembly comprising:

A. a spoollike tape guide member, 1. having flanges at its top and bottom for guiding tape as it is passed between said flanges, 2. said guide member having means forming a central opening therethrough;

B. a pin secured to said tape cartridge and slidably supporting said guide member through said central opening; and C. a guide positioning element on said recorder/reproducer, 1. said guide positioning element having guide surfaces for camming and closely engaging said guide member flange to move and hold said guide member on said pin, whereby said guide member is accurately positioned with respect to said transducer by said guide positioning element when said cartridge is inserted into the recorder/reproducer.

7. The locating and positioning assembly defined in claim 6 wherein said guide positioning element comprises a bar rigidly mounted at one end and having a double vertical taper at its free end for camming the flanges of said guide member to a holding position along said bar when said cartridge is inserted into the recorder/reproducer.

8. In a magnetic tape-recording cartridge having a pressure member for urging a recording tape against a capstan when the cartridge is inserted into a recording/reproducing apparatus, a mounting for said pressure member comprising:

A. a cartridge housing of relatively thin, inexpensive material enclosing said tape cartridge; and B. an elongated rigid member positioned adjacent the side of said tape cartridge housing, 1. and having a bifurcated end portion thereon for mounting said pressure member, 2. means on said rigid member end for retaining said pressure member in a predetermined position with respect to said capstan in said recorder/reproducer, and 3. engaging means on said rigid member for engaging a recording/reproducing apparatus to position said cartridge with respect to said capstan.

9. A magnetic tape-recording cartridge as defined in claim 8 wherein said bifurcated end portion is hinged to said rigid member and resilient means are provided for urging said bifurcated end portion toward said capstan.

10. A magnetic tape recording cartridge as defined in claim 8 wherein said rigid member is provided with a notched portion between said bifurcated end portion and the remainder of said rigid member to provide a flexible link portion therebetween and resilient means in said notched portion urging said bifurcated portion toward the capstan when said cartridge is inserted into a tape recording/reproducing apparatus.